United States Patent [19]

Harris

[11] Patent Number: 5,223,906
[45] Date of Patent: Jun. 29, 1993

[54] FOUR COLOR TONER SINGLE PASS COLOR PRINTING SYSTEM USING TWO TRI-LEVEL XEROGRAPHIC UNITS

[75] Inventor: Ellis D. Harris, Claremont, Calif.
[73] Assignee: Xerox Corporation, Stamford, Conn.
[21] Appl. No.: 923,648
[22] Filed: Aug. 3, 1992
[51] Int. Cl.⁵ .............................................. G03G 15/01
[52] U.S. Cl. ..................................... 355/326; 346/157
[58] Field of Search ............................... 355/326–328; 346/157; 358/298, 300

[56] References Cited

U.S. PATENT DOCUMENTS

| | | | |
|---|---|---|---|
| 4,731,634 | 3/1988 | Stark | 355/328 |
| 5,121,171 | 6/1992 | Knapp | 355/326 |

Primary Examiner—Joan H. Pendegrass
Attorney, Agent, or Firm—William Propp

[57] ABSTRACT

A four color toner single pass color printing system consists generally of a raster output scanner (ROS) optical system and two tri-level xerographic units in tandem. Only two of the three subtractive primary colors of cyan, magenta and yellow are available for toner dot upon toner dot to combine to produce the additive primary colors. The resulting color printing system would be able to produce pixels of black and white and five of the six primary colors, with pixel next to pixel printing producing all but the strongest saturation of the sixth primary color, an additive primary color. The color printing system uses either four color toners or a black toner and three color toners.

9 Claims, 6 Drawing Sheets

FOUR COLOR TONER SINGLE PASS COLOR PRINTING SYSTEM USING TWO TRI-LEVEL XEROGRAPHIC UNITS

BACKGROUND OF THE INVENTION

The present invention relates generally to a four color toner single pass color printing system and, more particularly, to a color printing system consisting generally of a raster output scanner (ROS) optical system and two tri-level xerographic units in tandem which can print pixels producing black and white and five of the six primary colors, with pixel next to pixel printing producing all but the strongest saturation of the sixth primary color.

In the practice of conventional bi-level xerography, it is the general procedure to form electrostatic latent images on a charge retentive surface such as a photoconductive member by first uniformly charging the charge retentive surface. The electrostatic charge is selectively dissipated in accordance with a pattern of activating radiation corresponding to original images. The selective dissipation of the charge leaves a bi-level latent charge pattern on the imaging surface where the high charge regions correspond to the areas not exposed by radiation. One level of this charge pattern is made visible by developing it with toner. The toner is generally a colored powder that adheres to the charge pattern by electrostatic attraction. The developed image is then fixed to the imaging surface, or is transferred to a receiving substrate such as plain paper, to which it is fixed by suitable fusing techniques.

In tri-level, highlight color imaging, unlike conventional xerography, upon exposure, three charge levels are produced on the charge-retentive surface. The highly charged (i.e. unexposed) areas are developed with toner, and the area more fully discharged is also developed, but with a toner of a different color. Thus, the charge retentive surface contains three exposure levels; zero exposure, intermediate exposure, and full exposure, which correspond to three charge levels. These three levels can be developed to print, for example, black, white, and a single color.

FIG. 1 is a schematic drawing of a prior art tri-level xerographic printing system. As shown, the system utilizes a charge retentive member in the form of a photoconductive belt 10, consisting of a photoconductive surface on an electrically conductive, light-transmissive substrate mounted for movement past a charge station A, an exposure station B, developer station C, transfer station D, and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller, and the latter of which can be used to provide suitable tensioning of the photoreceptor belt 10. Motor 23 rotates roller 18 to advance belt 10 in the direction of arrow 16. Roller 18 is coupled by motor 23 by suitable means such as a belt drive.

As can be seen by further reference to FIG. 2, initially successive portions of belt 10 pass through charging station A, where a corona discharge device such as a scorotron, corotron, or dicorotron, indicated generally by the reference numeral 24, charges the belt 10 to a selectively high uniform positive or negative potential, $V_O$. Any suitable control circuit, as well known in the art, may be employed for controlling the corona discharge device 24.

Next, the charged portions of the photoreceptor surface are advanced through exposure station B. At exposure station B, the uniformly charged surface of belt 10 is exposed by a tri-level raster output scanner (ROS) unit 25, which causes the charge retentive surface to be discharged in accordance with the output from the scanning device. This scan results in three separate discharge regions on the photoreceptor, each region exposed at one of three possible levels: (1) zero exposure which results in a voltage equal to $V_{ddp}$ and will be developed using charged-area-development (CAD); (2) full exposure, which results in a low voltage level $V_C$ and is developed using discharged-area-development (DAD); and (3) intermediate exposure, which yields an intermediate voltage level $V_W$ and does not develop and yields a white region on the print. These voltage levels are shown schematically in FIG. 2. Some typical voltage levels are as follows.

The photoreceptor, which is initially charged to a voltage $V_O$, undergoes dark decay to a level $V_{ddp}$ ($V_{CAD}$) equal to about $-900$ volts. When exposed at the exposure station B, the photoreceptor is discharged to $V_c$, ($V_{DAD}$) equal to about $-100$ volts in the highlight (i.e. color other than black) color portions of the image. The photoreceptor is also discharged to $V_W$ ($V_{white}$) equal to $-500$ volts imagewise in the background (i.e. white), image areas and in the inter-document area. Thus the image exposure is at three levels; zero exposure (i.e. black), intermediate exposure (white) and full exposure (i.e. color). After passing through the exposure station, the photoreceptor contains highly charged areas and fully discharged areas which correspond to CAD and DAD color latent images, and also contains an intermediate level charged area that is not developed.

At development station C, a development system, indicated generally by the reference numeral 30, advances developer materials into contact with the CAD and DAD electrostatic latent images. The development system 30 comprises first and second developer housings 32 and 34. The developer housing 32 contains a pair of magnetic brush rollers 35 and 36. The rollers advance developer material 40 into contact with the photoreceptor for developing the charge-area regions ($V_{CAD}$). The developer material 40, by way of example, contains positively charged black toner. Electrical biasing is accomplished via power supply 41, electrically connected to developer apparatus 32. A suitable DC bias, $V_{bb}$, of approximately $-600$ volts is applied to the rollers 35 and 36 via the power supply 41.

The developer housing 34 contains a pair of magnetic rolls 37 and 38. The rollers advance developer material 42 into contact with the photoreceptor for developing the discharge-area regions ($V_{DAD}$). The developer material 42, by way of example, contains negatively charged red toner. Appropriate electrical biasing is accomplished via power supply 43 electrically connected to developer apparatus 34. A suitable DC bias, $V_{cb}$, of approximately $-400$ volts is applied to the rollers 37 and 38 via the bias power supply 43.

Because the composite image developed on the photoreceptor consists of both positive and negative toner, a positive pre-transfer corona discharge member (not shown) is provided to condition the toner for effective transfer to a substrate, using positive corona discharge.

The pre-transfer corona discharge member is preferably an AC corona device, biased with a DC voltage to operate in a field sensitive mode, to perform tri-level xerography pre-transfer charging in a way that selectively adds more charge (or at least comparable charge) to the region of the composite tri-level image that must have its polarity reversed. This charge discrimination is enhanced by discharging the photoreceptor carrying the composite developed latent image with light before the pre-transfer charging this minimizes the tendency to overcharge portions of the image which are already at the correct polarity.

Referring again to FIG. 1, a sheet of support material 58 is moved into contact with the toner image at transfer station D. The sheet of support material is advanced to transfer station D by conventional sheet feeding apparatus, not shown. Preferably, the sheet feeding apparatus includes a feed roll contacting the upper most sheet of a stack of copy sheets. Feed rolls rotate to advance the uppermost sheet from the stack into a chute, which directs the advancing sheet of support material into contact with the surface of belt 10 in a timed sequence, so that the developed toner powder image contacts the advancing sheet of support material at transfer station D.

Transfer station D includes a corona generating device 60 which sprays ions of a suitable polarity onto the backside of sheet 58. This attracts the charged toner powder images from the belt 10 to sheet 58. After transfer, the sheet continues to move in the direction of arrow 62 onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68, with the toner powder image contacting fuser roller 66. In this manner, the toner powder image is permanently affixed to sheet 58. After fusing, a chute, not shown, guides the advancing sheet 58 to a catch tray (also not shown), for subsequent removal from the printing machine by the operator.

After the sheet of support material is separated from the photoconductive surface of belt 10, the residual toner particles carried by the non-image areas on the photoconductive surface are removed therefrom. These particles are removed at cleaning station F. A magnetic brush cleaner housing is disposed at the cleaner station F. The cleaner apparatus comprises a conventional magnetic brush roll structure for causing carrier particles in the cleaner housing to form a brush-like orientation relative to the roll structure and the charge retentive surface. It also includes a pair of detoning rolls for removing the residual toner from the brush.

Subsequent to cleaning, a discharge lamp (not shown) floods the photoconductive surface with light to dissipate any residual electrostatic charge remaining, prior to the charging thereof, for the successive imaging cycle. Stabilization of the white or background discharge voltage level is accomplished by monitoring photoreceptor white discharge level in the inter-document area of the photoreceptor using an electrostatic voltmeter (ESV) 70. The information obtained thereby is utilized by control logic 72 to control the output of ROS unit 25 so as to maintain the white discharge level at a predetermined level. Further details of this stabilization technique are set forth in U.S. Pat. No. 4,990,955, assigned to the same assignee as the present invention.

There are several scanning techniques known in the prior art to obtain the tri-level exposure imaging. A conventional flying spot scanner, such as used in the Canon 9030 uses a ROS unit to "write" an exposed image on a photoreceptive surface a pixel at a time. To obtain higher spatial resolution, a pulse imaging scanner can be utilized. This pulse imaging scanner is also referred to as a Scophony scanner in an article in Optical Engineering, Vol. 24, No. 1, Jan./Feb. 1985, *Scophony Spatial Light Modulator*, by Richard Johnson et al., whose contents are hereby incorporated by reference. A preferred technique, capable of higher spatial resolution is to use similar optical elements as the flying spot scanner (rotating polygon, laser light source, pre-polygon and post-polygon optics), but with an A/O modulator which illuminates many pixels at a given time, resulting in a scanner with a coherent imaging response. With this type of scan system, the exposure level, or levels at the image surface, can be controlled by controlling the drive level of the A/O modulator dependent on the video data. In a tri-level system, two drive levels are used, one for the white exposure and a second higher drive level for the DAD exposure.

Alternately, instead of obtaining an intermediate exposure level by controlling the acoustic amplitude, an intermediate exposure can be provided by using pulse width modulation in a pulse imaging system in conjunction with spatial filtering.

A raster output scanner (ROS) optical system for creating tri-level exposures at a recording medium typically prints black, white, and a single color. However, a full color process would print the primary colors of cyan, yellow, magenta, blue, green, and red, in addition to black and white.

It is an object of this invention to provide a color printing system using tri-level xerographic units.

It is another object of this invention to provide a color printing system which can approximate a full color process. It is still another object of this invention to provide a single pass color printing system which will increase the pages per minute printing and will reduce the number and cost of optical and xerographic components.

SUMMARY OF THE INVENTION

In accordance with the present invention, a four color toner single pass color printing system consists generally of a raster output scanner (ROS) optical system and two tri-level xerographic units in tandem.

A full process full color printing system would be able to produce pixels of black and white and all six primary colors; red, green, blue, cyan, magenta and yellow using four color toners: black and the three subtractive primary colors of cyan, magenta and yellow. Pixels of the additive primary colors of blue, red and green would be produced by toner dot upon toner dot of a combination of the three subtractive primary color toners. With the toner dots of the three subtractive primary colors and black without combination with other toner dots, the resulting eight pixels can then be assembled into a full color palatte using pixel next to pixel.

With the two tri-level xerographic units, only two of the three subtractive primary colors of cyan, magenta and yellow are available for toner dot upon toner dot to combine to produce the additive primary colors. The resulting color printing system would be able to produce pixels of black and white and five of the six primary colors, with pixel next to pixel printing producing all but the strongest saturation of the sixth primary color, an additive primary color. The color printing system uses either four color toners or a black toner and three color toners.

Other objects and attainments together with a fuller understanding of the invention will become apparent and appreciated by referring to the following description and claims taken in conjunction with the accompanying drawings.

DESCRIPTION OF THE PREFERRED EMBODIMENT

Figure 1:
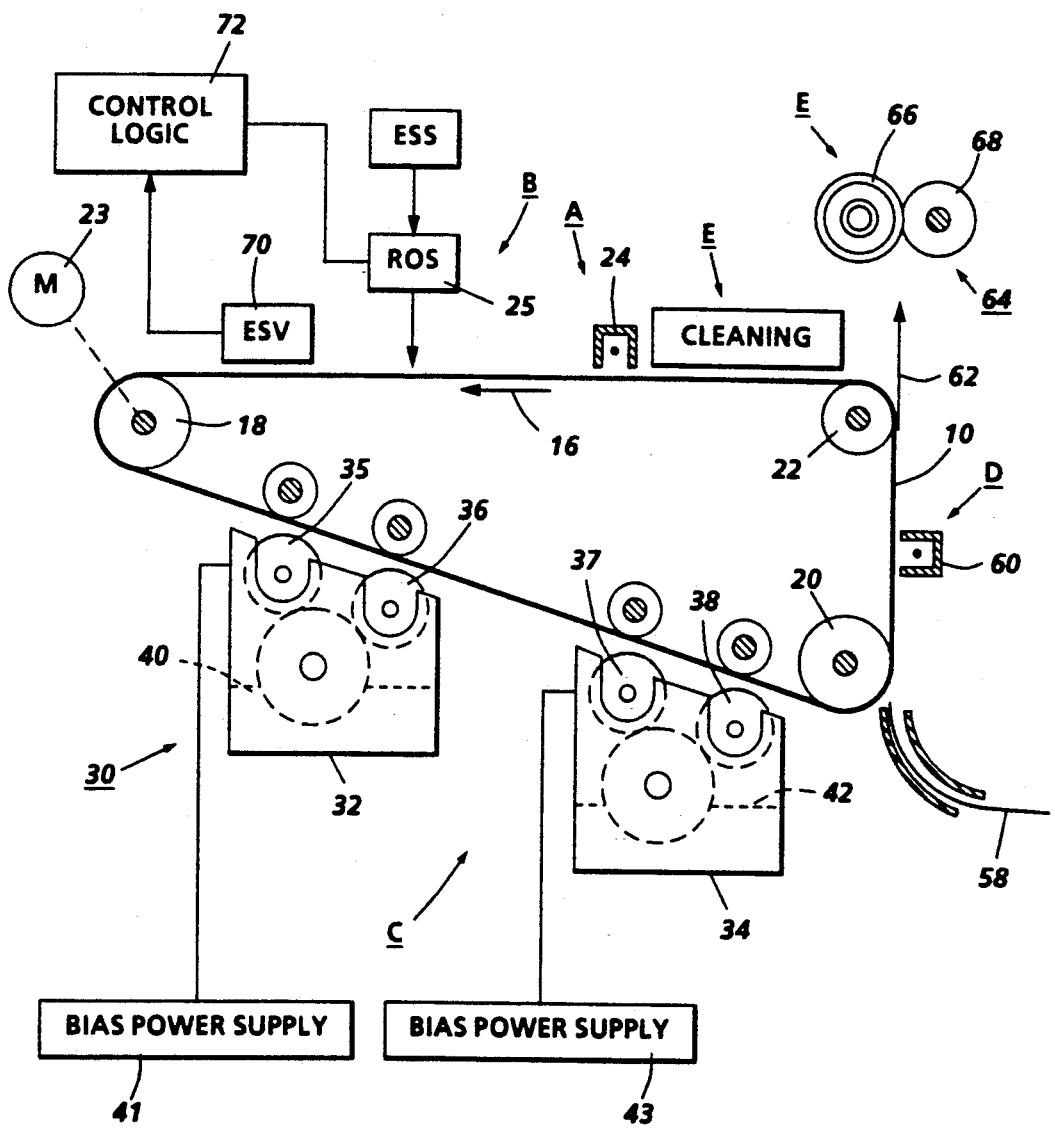
FIG. 1 is a schematic view of a prior art tri-level imaging system.
Figure 2A:
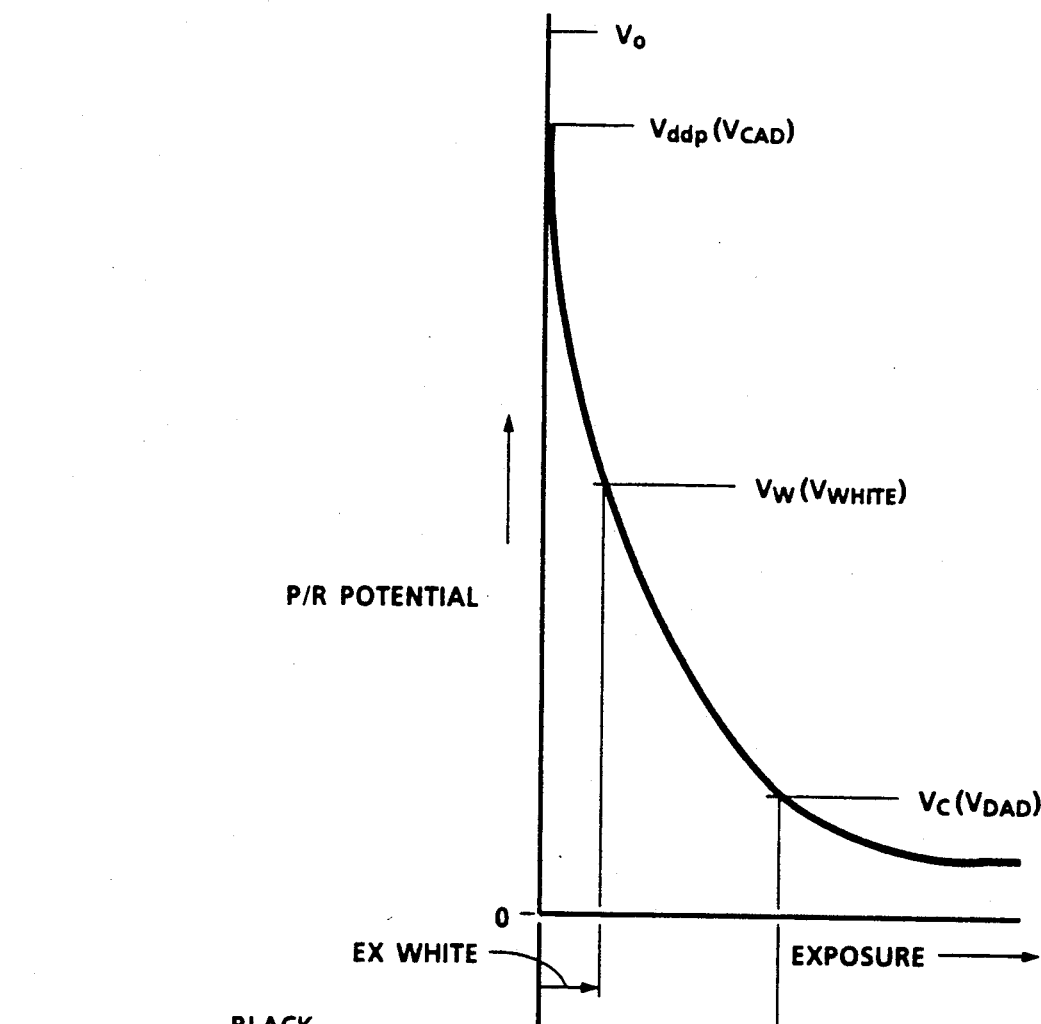
FIG. 2a and 2b show three voltage discharge levels obtained by the exposure system of FIG. 1.
Figure 2B:
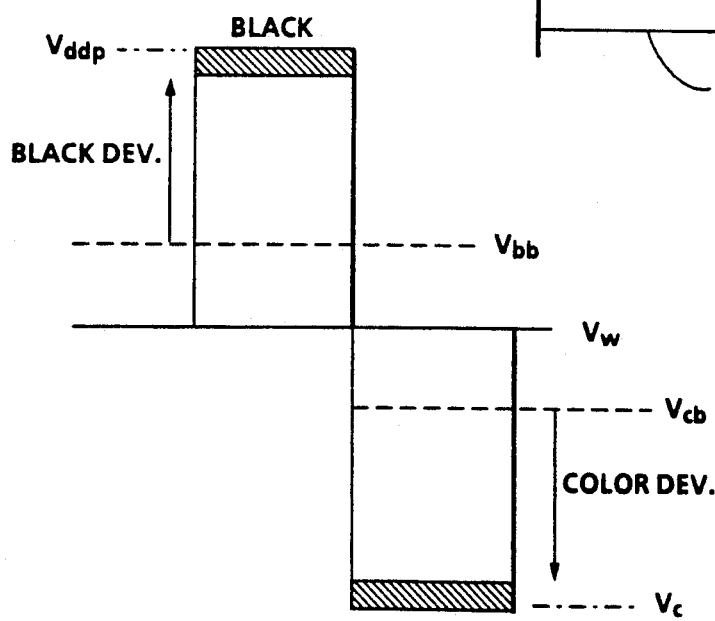
Figure 3:
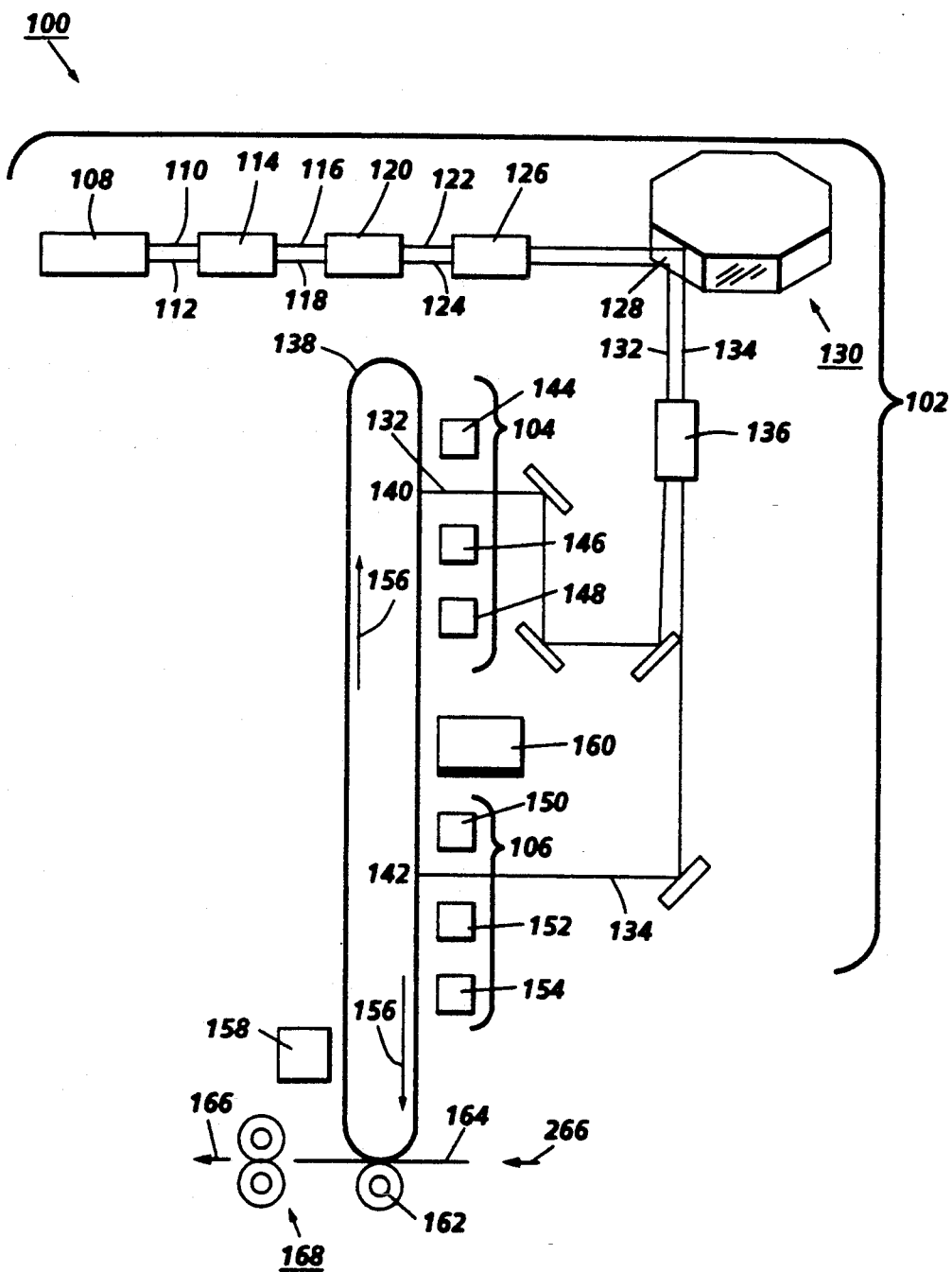
FIG. 3 is a schematic view of the color printing system using two tri-level xerographic units formed according to the present invention.

Reference is now made to FIG. 3, wherein there is illustrated a four color toner single pass color printing system 100. The color printing system 100 consists generally of a raster output scanner (ROS) optical system 102 and two tri-level xerographic units 104 and 106.

In the raster output scanner 102, a light source 108 emits two coherent laser beams 110 and 112 which are collimated and otherwise conditioned by collimating optical element 114. The two collimated beams 116 and 118 are independently modulated by dual channel modulator 120. The two modulated beams 122 and 124 are re-collimated, further conditioned and focused by optical element 126 onto a facet 128 of a rotating multi-faceted polygon mirror 130. The reflected, modulated beams 132 and 134 are imaged and focused by f-theta imaging and distortion correction optical element 136 and reflected by folding mirrors onto the photoreceptor belt 138 at two separate locations 140 and 142.

The first beam 132 is focused at point 140 on the photoreceptor belt 138 between the charging station 144 and the first and second developer stations 146 and 148 of the first tri-level xerographic unit 104 and the second beam 134 is focused at point 142 on the photoreceptor belt 138 between the charging station 150 and the first and second developer stations 152 and 154 of the second tri-level xerographic unit 106.

The photoreceptor belt 138 moves in the direction of arrow 156 to advance successive portions of the belt sequentially through the various processing stations disposed about the path of the photoreceptor belt. The belt advances driven by rollers and motors and belt drives (not shown).

Initially, successive portions of the photoreceptor belt 138 pass through a cleaning station 158. The cleaning station removes any residual toner particles and any residual charges from the photoreceptor belt.

The belt 138 next advances through the charging station 144 of the first tri-level xerographic unit 104. The charging station charges the belt to a selectively high uniform potential, $V_0$.

The charged belt is then exposed to the modulated light beam 132 from the tri-level raster output scanner (ROS) optical scanner, which causes the charged surface of the belt to be discharged in accordance with the modulated output of the beam 132. As previously discussed in this application, this results in three separate and different discharge and exposure levels; zero exposure, intermediate exposure and full exposure.

The photoreceptor belt 138 next passes through the first and second developer stations 146 and 148 of the first tri-level xerographic unit 104. The first developer housing 146 deposits the first toner upon portions or pixels of the photoreceptor belt 138 having zero exposure while the second developer housing 148 deposits the second toner upon portions or pixels of the photoreceptor belt 138 having full exposure, as previously discussed. No toner is deposited on the photoreceptor belt having intermediate exposure, as previously discussed.

The photoreceptor belt may then advance through the erasure section 160 which removes any residual charges from the first tri-level xerographic unit 104 on the photoreceptor belt. The erasure section does not remove, nor effect any toner on the belt from the first tri-level xerographic unit. The erasure section is optional since the charging station of the next tri-level xerographic unit will provide a uniform charge to the belt.

The belt 138 next passes through the charging station 150 of the second tri-level xerographic unit 106. The charging station charges the belt to a selectively high uniform potential, $V_0$.

The charged belt is then exposed to the modulated light beam 134 from the tri-level raster output scanner (ROS) optical scanner, which causes the charged surface of the belt to be discharged in accordance with the modulated output of the beam 134. As previously discussed in this application, this results in three separate and different discharge and exposure levels; zero exposure, intermediate exposure and full exposure.

The photoreceptor belt 138 next passes through the first and second developer stations 152 and 154 of the second tri-level xerographic unit 106. The first developer housing 152 deposits the third toner upon portions or pixels of the photoreceptor belt 138 having zero exposure while the second developer housing 154 deposits the fourth toner upon portions or pixels of the photoreceptor belt 138 having full exposure, as previously discussed. No toner is deposited on the photoreceptor belt having intermediate exposure, as previously discussed.

Toner from the developer housings of the second tri-level xerographic unit can be deposited on toner on the photoreceptor belt from the developer housings of the first tri-level xerographic unit.

The photoreceptor belt 138 then advances through the transfer station 162. A sheet of support material 164 is moved into contact with the toner upon the photoreceptor belt 138 at the transfer station 162 to transfer the toner to the sheet 164. The toner deposited upon the belt and thus the toner transferred to the sheet would include toner from both tri-level xerographic units 104 and 106.

After transfer, the sheet 164 moves in the direction of arrow 166 which advances the sheet to fusing station 168. Fusing station 168 permanently affixes the transferred toner image to the sheet 164, as previously discussed.

After the toner is separated from the photoreceptor belt, the belt 138 then passes through the cleaning station 158 and the printing cycle is complete. The cleaning station removes any residual toner particles and any residual charges from the photoreceptor belt.

In the single pass color printing system 100, toner from the second xerographic unit 106 can be deposited on toner previously deposited from the first xerographic unit 104 resulting in toner dot-upon-toner dot pixels on the photoreceptor belt and subsequently on the sheet of support material. The two toners from the same xerographic unit cannot, however, be deposited toner dot-upon-toner dot to produce a pixel on the photoreceptor belt.

Toner from the second xerographic unit can be deposited upon the same spot on the photoreceptor belt as toner deposited from the first xerographic unit. Thus, the third toner from the developer station 152 of the second xerographic unit 106 could be deposited on the first toner from the developer station 146 of the first xerographic unit 104 or could be deposited on the second toner from the developer station 148 of the first xerographic unit 104. The fourth toner from the developer station 154 of the second xerographic unit 106 could be deposited on the first toner from the developer station 146 of the first xerographic unit 104 or could be deposited on the second toner from the developer station 148 of the first xerographic unit 104. And both the third and fourth toners from the developer stations 152 and 154 of the second xerographic unit 106 can be deposited on the first toner from the developer station 146 of the first xerographic unit 104 or could be deposited on the second toner from the developer station 148 of the first xerographic unit 104. These permutations allow toner of one color deposited on toner of another color to form a pixel on the belt of a different color.

A full process full color printing system would be able to produce pixels of black and white and all six primary colors; red, green, blue, cyan, magenta and yellow using four color toners: black and the three subtractive primary colors of cyan, magenta and yellow. Pixels of the additive primary colors of blue, red and green would be produced by toner dot upon toner dot of a combination of the three subtractive primary color toners. With the toner dots of the three subtractive primary colors and black without combination with other toner dots, the resulting eight pixels can then be assembled into a full color palette using pixel next to pixel.

With the two tri-level xerographic units, only two of the three subtractive primary colors of cyan, magenta and yellow are available for toner dot upon toner dot to combine to produce the additive primary colors. The color printing system 100 of the present invention which uses four toner colors and a single pass can produce pixels of black and white and five of the six primary colors with pixel next to pixel printing producing all but the strongest saturation of the sixth primary color, an additive primary color.

Figure 4:
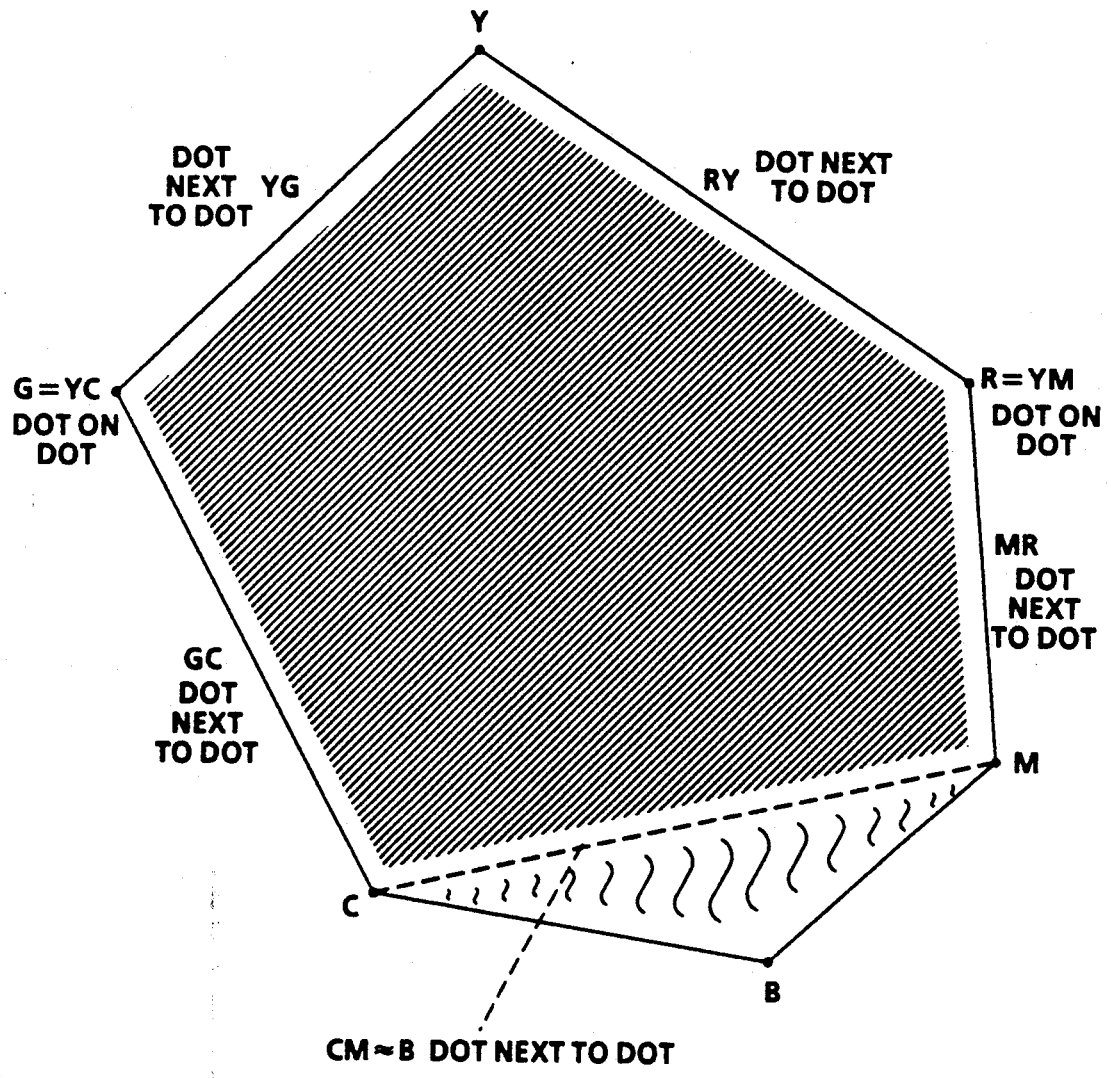
FIG. 4 is a schematic illustration of a hue-saturation color circle pallete.

The hue of a color is the primary colors. Hue is illustrated in FIG. 4 with a six-sided polygon circle with yellow, red, magenta, blue, cyan, and green arranged in order around the vertexes of the polygon. The saturation of a color extends from the greyest to its most vivid color. Saturation is represented in FIG. 4 by the interior of the six-sided polygon. The center has zero saturation where the colors are the most grey with the saturation increasing to the least grey, most vivid color, at the vertexes or along the boundaries of the polygon circle. The six-sided polygon circle is a hue-saturation palatte of colors available for printing.

A vertical axis through the hue-saturation palatte of FIG. 4 would show the lightness of color from black through a series of lightening greys to white.

As shown in FIG. 4, with the appropriate four toners in the color printing system 100, within the hue-saturation pallete, blue is the missing toner dot-upon-toner dot pixel. However, a cyan pixel next to a magenta pixel will print all but the strongest saturated blue.

One embodiment of the color printing system of the present invention involves the use of four non-black color toners in the four developer stations of the two tri-level xerographic units.

In the color printing system 100 of the present invention, the first toner will be green and the second toner will be yellow in the developer stations 146 and 148 of the first tri-level xerographic unit 104. The third toner will be cyan and the fourth toner will be magenta in the developer stations 152 and 154 of the second tri-level xerographic unit 106.

Figure 5:
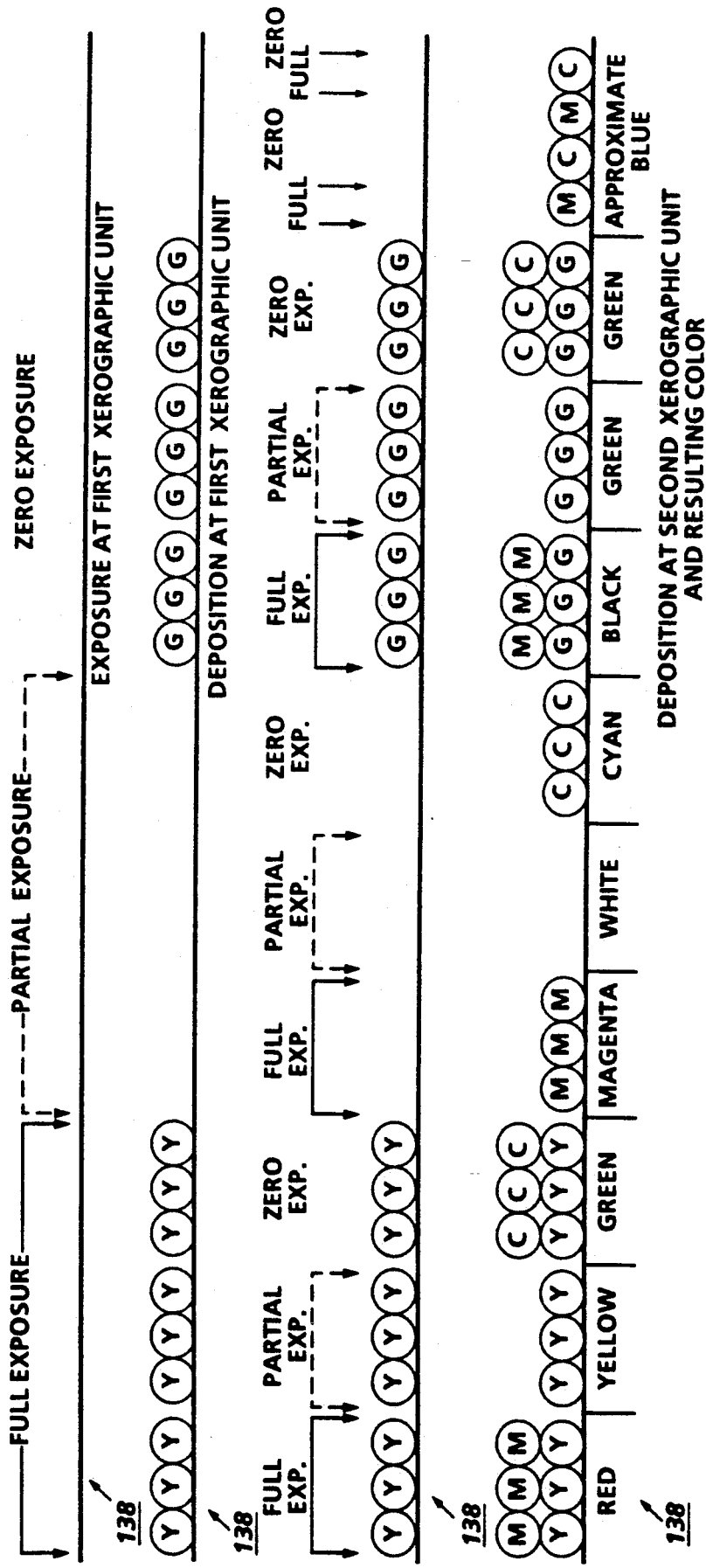
FIG. 5 is a schematic illustration of the exposure and development of the toners by the first and second xerographic units upon the photoreceptor belt and the resulting colors using four color toners.

As shown in FIG. 5, a white pixel is produced by no toner being deposited on the photoreceptor belt 138 and the sheet of support material 164 being white. A green pixel is produced by green toner alone being deposited. A yellow pixel is produced by yellow toner alone being deposited. A cyan pixel is produced by cyan toner alone being deposited. A magenta pixel is produced by magenta alone being deposited.

A black pixel is produced by depositing green and depositing magenta on top of the green. A red pixel is produced by depositing yellow and depositing magenta on top of the yellow. No blue pixel is available since cyan and magenta cannot be deposited upon one another. In the color palette, the missing blue tones can be approximated by depositing cyan and depositing magenta next to the cyan and black and white can be added to the cyan-next-to-magenta.

A green pixel may also be produced by depositing green and depositing cyan on top of the green or by depositing yellow and depositing cyan on top of the yellow.

If blue is to be the missing pixel color then it is essential that the green and yellow toners be in the developer stations of one xerographic unit and that the cyan and magenta toners be in the developer stations of the other xerographic unit. It is not essential, however, that the green and yellow toners be in the first xerographic unit and the cyan and magenta toners be in the second xerographic unit. The color printing system of the present invention will produce the same scheme with cyan and magenta toners in the first xerographic unit and green and yellow toners in the second xerographic unit.

It is also not essential that green be the first toner and yellow be the second toner. Yellow could be the first toner and green could be the second. Similarly, magenta and cyan could be in the third and fourth toner, respectively. Within each xerographic unit, the order of the colors of the toners is not essential.

The missing color, the color that can only be approximated with the strongest saturated portions not being available to be printed, must be one of the three additive primary colors; red, blue and green. The toner colors must be a combination of four of the remaining additive primary colors and the subtractive primary colors; cyan, yellow and magenta.

If the missing color is green, then the color printing system of the present invention will be unable to approximate the strongest saturated green of some vegetation. If the missing color is red, then the color printing system of the present invention will be unable to approximate the strongest saturated red of some flesh tones. If the missing color is blue, then the color printing system of the present invention will be unable to approximate the strongest saturated blue which is some shades of sky.

The illustrative example of color printing system 100 had green and yellow toner in one xerographic unit and cyan and magenta toner in the other xerographic unit for a missing blue color scheme. Alternatively, a color printing system for a missing blue color scheme can be produced with red and yellow toner in one xerographic unit and cyan and magenta toner in the other xerographic unit.

The general rule for selection of toners for the four developer stations in the two xerographic units is that one unit should have one of the remaining additive primary toner and the toner in the opposite subtractive primary color in hue from the missing additive primary color and the other unit should have toners in the two adjacent subtractive primary colors in hue to the missing additive primary color. Thus, for a color scheme where green is missing, one unit should have red or blue toner and magenta toner and the other unit should have cyan and yellow toners. The missing green color could be approximated by cyan next to yellow with only the strongest saturated green missing. For a color scheme where red is missing, one unit should have green or blue toner and cyan toner and the other unit should have yellow and magenta toners. The missing red color could be approximated by yellow next to magenta with only the strongest saturated red missing.

Once again, the pairing of the toner colors in the developer stations of one xerographic unit is essential, whether that pair of toner colors is in the first or second xerographic unit is not essential and whether the toner colors within the xerographic unit are in the first or second developer unit is not essential.

The use of black toner in one of the developer stations of the xerographic units presents special circumstances other than the use of toners of any of the primary colors. Black deposited and combined with any other color will produce only black. Thus, any color toner deposited subsequently on black will still yield black and black toner deposited on any color will also yield black. There is no combining of colors possible when black is involved as one of the colors being mixed.

One embodiment of the color printing system of the present invention involves the use of a black toner and three color toners in the four developer stations of the two tri-level xerographic units.

In the color printing system 100 of the present invention, the first toner will be black and the second toner will be yellow in the developer stations 146 and 148 of the first tri-level xerographic unit 104. The third toner will be cyan and the fourth toner will be magenta in the developer stations 152 and 154 of the second tri-level xerographic unit 106.

Figure 6:
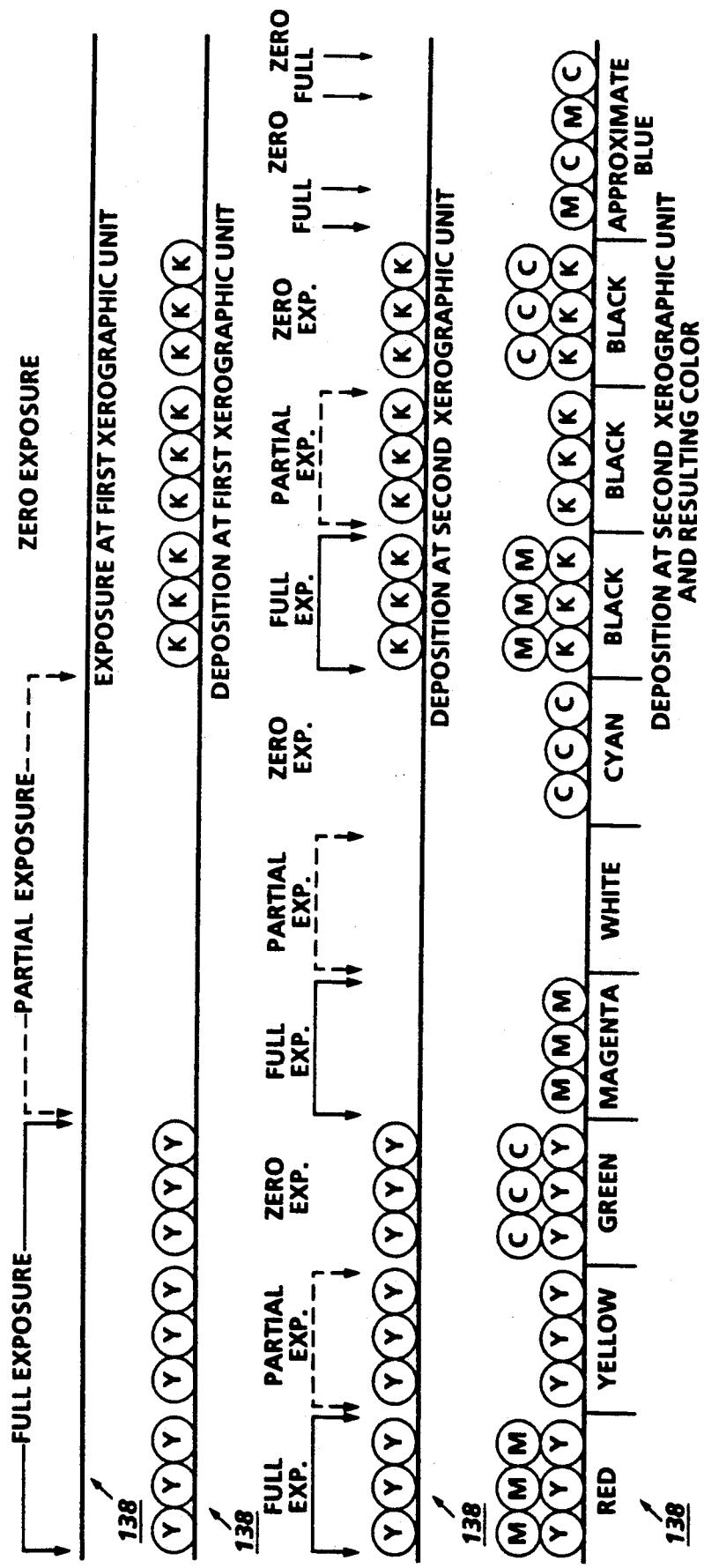
FIG. 6 is a schematic illustration of the exposure and development of the toners by the first and second xerographic units upon the photoreceptor belt and the resulting colors using black and three color toners.

As shown in FIG. 6, a white pixel is produced by no toner being deposited on the photoreceptor belt 138 and the sheet of support material 164 being white. A black pixel is produced by black toner alone being deposited or black with cyan or black with magenta or black with cyan and magenta toner being deposited. A yellow pixel is produced by yellow toner alone being deposited. A cyan pixel is produced by cyan toner alone being deposited. A magenta pixel is produced by magenta alone being deposited.

A green pixel is produced by depositing yellow and depositing cyan on top of the yellow. A red pixel is produced by depositing yellow and depositing magenta on top of the yellow. No blue pixel is available since cyan and magenta cannot be deposited upon one another. In the color palette, the missing blue tones can be approximated by depositing cyan and depositing magenta next to the cyan and black and white can be added to the cyan-next-to-magenta.

If blue is to be the missing pixel color then it is essential that the black and yellow toners be in the developer stations of one xerographic unit and that the cyan and magenta toners be in the developer stations of the other xerographic unit. It is not essential, however, that the black and yellow toners be in the first xerographic unit and the cyan and magenta toners be in the second xerographic unit. The color printing system of the present invention will produce the same color scheme with cyan and magenta toners in the first xerographic unit and black and yellow toners in the second xerographic unit.

It is also not essential that black be the first toner and yellow be the second toner. Yellow could be the first toner and black could be the second. Similarly, magenta and cyan could be in the third and fourth toner, respectively. Within each xerographic unit, the order of the colors of the toners is not essential.

The missing color, the color that can only be approximated with the strongest saturated portions not being available to be printed, must be one of the additive primary colors; red, blue and green. The toner colors must be a combination of four of: black or white and the subtractive primary colors; cyan, yellow and magenta.

If the missing color is green, then the color printing system of the present invention will be unable to approximate the strongest saturated green of some vegetation. If the missing color is red, then the color printing system of the present invention will be unable to approximate the strongest saturated red of some flesh tones. If the missing color is blue, then the color printing system of the present invention will be unable to approximate the strongest saturated blue which is some shades of sky.

The general rule for selection of toners for the four developer stations in the two xerographic units is that one unit should have black toner and toner in the opposite subtractive primary color in hue from the missing additive primary color and the other unit should have toners in the two adjacent subtractive primary colors in hue to the missing additive primary color. Thus, for a color scheme where green is missing, one unit should have black and magenta toners and the other unit should have cyan and yellow toners. The missing green color could be approximated by cyan next to yellow with only the strongest saturated green missing. For a color scheme where red is missing, one unit should have black and cyan toners and the other unit should have yellow and magenta toners. The missing red color could be approximated by yellow next to magenta with only the strongest saturated red missing.

Once again, the pairing of the toner colors in the developer stations of one xerographic unit is essential, whether that pair of toner colors is in the first or second xerographic unit is not essential and whether the toner colors within the xerographic unit are in the first or second developer unit is not essential.

In either embodiment, the human eye can not perceive the individual colored spots produced by the color printing system 100. The eye blurs clusters of color pixels together to discern a hue, saturation and lightness that it discerns as a color. This is why a magenta pixel next to a cyan pixel will appear as blue to the human eye. Typically, depending upon the size of the individual spot, these pixels can be clustered in a 2 by 4 or a 3 by 3 matrix of individual pixels.

The individual pixels within the matrix can be the same color or different colors. If the individual spots are the same color, then that pixel will be of the strongest saturation of that color, the most vivid shade of that color. By having different colors for the pixels in the matrix, the saturation and hue of the pixel will vary within the hue-saturation color circle pallete of FIG. 4.

By having the pixels in the matrix be exclusively from two adjacent colors in the spectrum, the resulting pixel matrix color will be along the hue boundary between the colors and of the strongest saturation. By having the pixels in the matrix be exclusively from two non-adjacent colors in the spectrum, the resulting pixel matrix color will be along a line within the hue-saturation color circle pallete of varying hues and saturation. By having the pixels of the matrix be of three or more colors, the hue and saturation of the pixel matrix will vary. The entire hue and saturation range within the hue-saturation color circle pallete of FIG. 4 is possible to be printed with the color printing system 100 with the previous exception of the strongest saturated missing color, blue in FIG. 4.

The lightness and darkness of the color produced by the color printing system 100 is achieved by adding white or black color pixels to the matrix. Pink, or light red, is printed by having a pixel matrix of 50% red and 50% white.

If the sheet of support material is not white, then a white toner may be used within the developer housings of the xerographic units.

If the first and second modulated beam have the same wavelength, then the color printing system has simpler modulator and optical elements which do not have to be calibrated for two wavelengths and an easier calculation of the optical paths of the two beams. The optical paths of the two beams should be the same length, although it is not impossible to have differing lengths for the optical paths. The dual channel modulator may be able to compensate for any difference in lengths of the optical paths.

The use of a dual beam light source with the two emitted beams sharing the same optical elements in the raster output scanner optical system provides improved pixel placement accuracy upon the photoreceptor belt since a common polygon facet is used. The use of tri-level xerographic units also aids in pixel placement accuracy upon the photoreceptor belt. Sharing the optical components also reduces the physical size, the number of optical elements and the costs of the four color single pass color printing system.

However, the sharing of optical elements by the dual beams is merely an illustrative example of the color printing system. Two separate light sources could each emit a beam. Each beam could have a separate ROS optical system or just share certain ROS optical elements, like the facet of the rotating polygon mirror. A single light should emit a single beam which is split by beam splitting means anywhere along the ROS optical system, prior to the two tri-level xerographic units.

The photoreceptor belt of the present invention can, in the alternative, be a drum photoreceptor or other equivalents. The rotating polygon raster output scanner (ROS) optical system 102 can, in the alternative, be a LED image bar or other equivalents.

The light source 108, the collimating optical element 114 and the dual channel modulator 120 can be replaced by a diode laser which is modulated electronically.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A four color toner single pass color printing system comprising:
    a raster output scanner optical system for generating a first modulated beam and a second modulated beam,
    a photoreceptor means,
    a first tri-level xerographic unit for charging said photoreceptor means, said photoreceptor means then being exposed to said first modulated beam, said first tri-level xerographic unit having means for depositing a first color toner and a second color toner on said photoreceptor means based on the charge, after exposure to said first modulated beam, and
    a second tri-level xerographic unit for charging said photoreceptor means, subsequent to said first tri-level xerographic unit, said photoreceptor means then being exposed to said second modulated beam, said second tri-level xerographic unit having means for depositing a third color toner and a fourth color toner on said photoreceptor means based on the charge, after exposure to said second modulated beam, whereby said color toners produce pixels for black and white and five of the six primary colors with pixel next to pixel producing all but the strongest saturation of the sixth primary color.

2. The four color toner single pass color printing system of claim 1 further comprising:
    means for transfering said toners upon said photoreceptor means onto a sheet of suport material.

3. The four color toner single pass color printing system of claim 1 further comprising:
    erasure means between said first tri-level xerographic unit and said second tri-level xerographic unit for removal of any residual charge on said photoreceptor means.

4. The four color toner single pass color printing system of claim 1 wherein said photoreceptor means is a photoreceptor belt.

5. The four color toner single pass color printing system of claim 1 wherein said photoreceptor means is a photoreceptor drum.

6. The four color toner single pass color printing system of claim 1 wherein said sixth primary color is an additive primary color, one of said first and second color toners is one of the remaining additive primary color from the sixth primary color and the other of said first and second color toners is the opposite subtractive primary color in hue from the sixth primary color; and the third and fourth color toners are the two adjacent subtractive primary colors in hue to the sixth primary color.

7. The four color toner single pass color printing system of claim 6 wherein said sixth primary color is blue, said first toner color is green, said second toner color is yellow, said third toner color is cyan and said fourth toner color is magenta.

8. The four color toner single pass color printing system of claim 1 wherein said sixth primary color is an additive primary color, one of said first and second color toners is black and the other of said first and second color toners is the opposite subtractive primary color in hue from the sixth primary color; and the third and fourth color toners are the two adjacent subtractive primary colors in hue to the sixth primary color.

9. The four color toner single pass color printing system of claim 8 wherein said sixth primary color is blue, said first toner color is black, said second toner color is yellow, said third toner color is cyan and said fourth toner color is magenta.

* * * * *